Patented Apr. 22, 1930

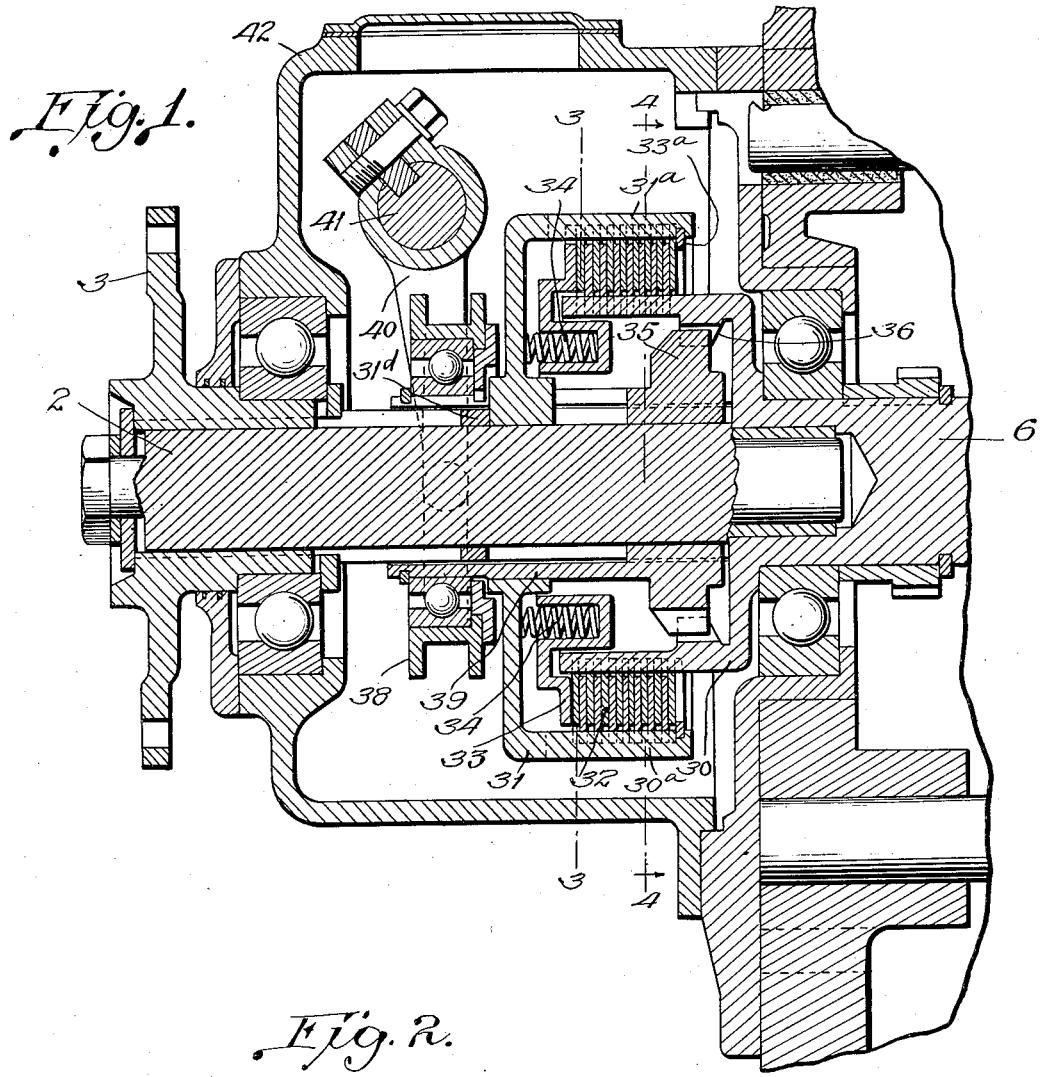

1,755,769

UNITED STATES PATENT OFFICE

GEORGE C. CARHART, OF SYRACUSE, NEW YORK, ASSIGNOR TO BROWN-LIPE GEAR COMPANY, OF SYRACUSE, NEW YORK, A CORPORATION OF NEW YORK

TRANSMISSION MECHANISM

Application filed August 9, 1924. Serial No. 731,209.

This invention relates to transmission mechanism such as is used in motor vehicles and has for its object a particularly simple and efficient synchronizing clutch, especially adapted to be located between the transmission gearing and the propeller shaft which clutch comprises compactly arranged positively and frictionally engaging sections.

The invention consists in the novel features and in the combinations and constructions hereinafter set forth and claimed.

In describing this invention reference is had to the accompanying drawings in which like characters designate corresponding parts in all the views.

Figure 1 is a vertical sectional view of this clutch, the contiguous part of a change speed transmission gearing being also shown.

Figure 2 is an enlarged fragmentary elevation of parts seen in Figure 1.

Figure 3:
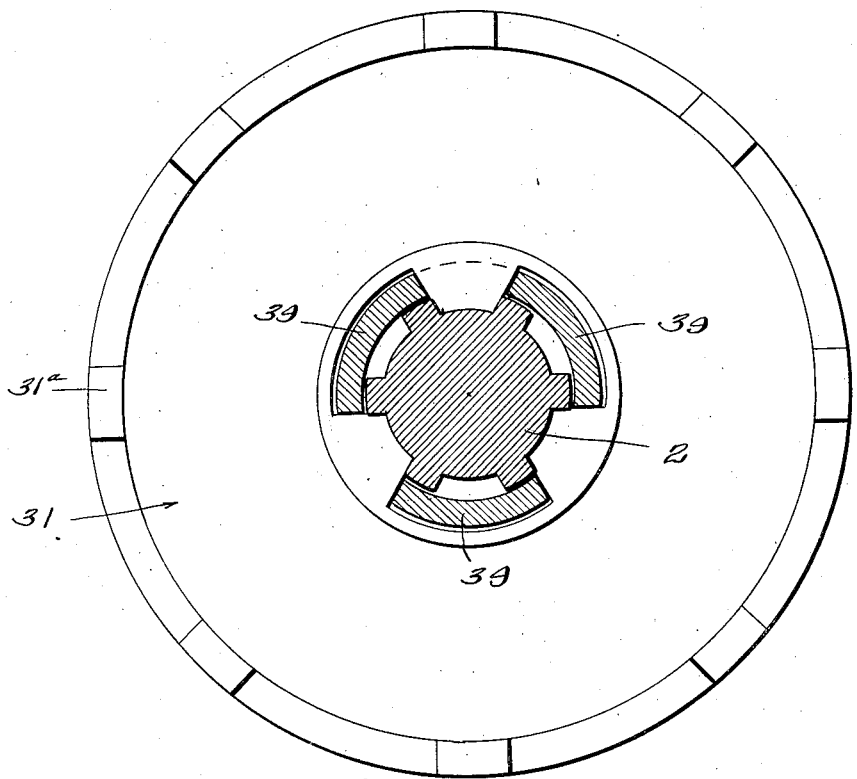
Figure 4:
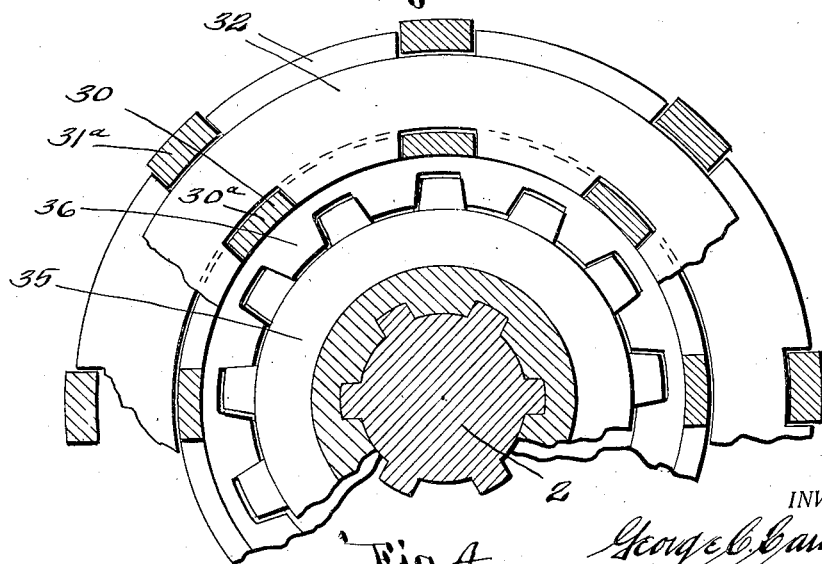

Figures 3 and 4 are enlarged sectional views taken respectively on the planes of lines 3—3 and 4—4, Figure 1.

2 is the driven element or shaft which is connected by a suitable coupling to the propeller shaft of the vehicle, a part of this coupling being designated 3.

4 designates the change speed gearing.

6 is the transmission shaft of the gearing, this being arranged in axial alinement with the driven element or shaft 2.

The construction of the transmission gearing forms no part of this invention and it may be of any suitable form, size and construction.

The main clutch, that is, the clutch for connecting the change speed gearing to the engine shaft, is located in a suitable housing 27, Figure 2, and is operated by a clutch shaft 26 mounted in the clutch housing.

The positive and friction clutches are combined in one mechanism including an inner drum or drum like member 30 mounted on the transmission shaft 6 outside of the casing of the transmission gearing and surrounding the shaft 2, an outer drum 31 mounted on the shaft 2 to rotate therewith, friction elements as sets of interleaved disks 32 interposed between the drums, the sets being interlocked respectively with the drums, a pressure plate 33 arranged to compress the disks against an abutment ring 33ª in the outer drum, springs 34 interposed between the plate and the head of the drum 31, a positive clutch section 35 mounted on the shaft 2 to rotate therewith and slide axially thereof, this clutch section being shiftable into and out of engagement with internal teeth 36 in the drum 30 and into and out of engagement with the pressure plate to release and engage the disks and throwout means for shifting the clutch section 35 out of engagement with the teeth 36 and thereafter engaging the pressure plate 33 and shifting it to the left to disengage the disks. The drum 30 is usually formed integral with the shaft 6. The annular walls of these drums are usually segmental or in the form of spaced parallel bars 30ª, 31ª to facilitate the interlocking of the disks therein. The drum 31 is held from axial shifting by a lock shoulder or ring 31ᵈ.

As seen in Figs. 3 and 4, the shaft 2 is a splined shaft, and the section 35 has a bore shaped to slidably fit the shaft 2. Also the hub of the drum 31 is shaped to fit the splines of the shaft 2.

The throwout mechanism includes a collar 38, slidable axially of the shaft 2 at the rear of the drum 31, and spaced parallel arms 39 overlying the ends of the splines, as seen in Fig. 3, and fixed to the clutch section 35, and to the collar 38, the arms 39 extending through the bore of the drum 31. The operating means for the throwout collar comprises a shifter arm 40 mounted on a rock shaft 41 journalled in the case 42, this shaft extending to the outside of the case 42 having connections with an operating member. The section 35 is spaced apart from the pressure plate and therefore upon rocking of the shaft 41 in a clockwise direction, Fig. 1, the throwout collar 38 first moves the section 35 out of engagement with the internal teeth 36 of the drum 30, thus disconnecting the positive clutch so that the drive is momentarily through the friction clutch and then moves into engagement with the pressure friction plate 33 to disengage the friction disks.

The operating members for the throwout shaft 41 comprise a cam 45 mounted on a stud 46 projecting from the casing 42, the cam coacting with a follower on a rock arm 47, mounted on the outer end of the shaft 41. 48 designates the follower which includes a lever pivoted at 49 to the rock arm 47 and carrying a roller 50 which coacts with the cam 45, the follower lever 48 being held from pivotal movement by a suitable adjusting screw 51 carried by the lever 47. The cam 45 is connected by suitable connections as by a link 61 to a rock arm 62 on the shaft 26 of the operating means for the main clutch. The face of the cam 41 is formed with a dwell portion 52, a lift portion 53, and a dwell portion 54, that is, there are two dwell portions and a lift portion between the dwell portions. Normally the roller 50 is engaged with the dwell portion 52 and upon depression of the clutch pedal 28 the cam 45 is rocked and the dwell portion 52 is moved along the follower to permit the main clutch to be disengaged or partially disengaged before the lift 53 of the cam rocks the arm 47, and hence the throwout shaft 41 to first disengage the positive clutch section 35 as the roller 50 rides on the lift 53, and shift it far enough to take up the lost motion between said section and the pressure plate 33 and shift the pressure plate to release the friction disks. When the clutch pedal is released the friction disks first engage and the rotary motion is momentarily transferred through the disks and then the positive clutch 35, 36 engages and finally the main clutch is fully engaged. By adjusting the set screw 51 the follower or roller 50 can be adjusted to the cam.

The movement of the throwout shaft 41 is against the action of a suitable spring 63 connected to the rock arm 47.

The casing 42 is suitably supported on the gear casing, it being shown as a cup provided with a bearing in the head of the cup for the shaft 2 and having a flange at its open end abutting against and secured to the rear wall of the transmission gear case.

What I claim is:

1. In a transmission mechanism, the combination of a transmission shaft and a driven shaft arranged in axial alinement, a clutch mechanism between said shafts comprising a drum mounted on the transmission shaft and enclosing a portion of the driven shaft, the drum having internal teeth, a second drum on the driven shaft having a portion enclosing and spaced apart from the former drum, coacting axially shiftable elements associated respectively with the drums, a toothed member slidable on the driven shaft within the first drum into and out of engagement with the internal teeth and throw-out mechanism arranged to successively disengage the toothed member from the internal teeth and disengage the friction elements, and to engage said elements and the toothed member with the internal teeth in the reverse order.

2. In a transmission mechanism, the combination of a transmission shaft and a driven shaft arranged in axial alinement, positive and friction clutches between the transmission shaft and the driven shaft including inner and outer drums mounted respectively on said shafts and coacting friction elements associated respectively with the drums, the drum mounted on the driven shaft having an axially shiftable part associated therewith, and coacting with the friction elements to engage the same, the inner drum being provided with internal teeth, a positive clutch section rotatable with and slidable axially of the driven shaft within the inner drum and shiftable into and out of engagement with the internal teeth and being also shiftable into engagement with said part to shift the same axially to release said friction elements, and throw out means connected to the positive clutch section.

3. In a transmission mechanism, the combination of a transmission shaft and a driven shaft arranged in axial alinement, a clutch mechanism between said shafts comprising a drum mounted on the transmission shaft and enclosing a portion of the driven shaft, a second drum on the driven shaft and having a portion enclosing and spaced apart from the periphery of the former drum, friction elements between the drums, a clutch head slidable on the driven shaft within the first drum, the first drum and the head having means for positively interlocking and the head being shiftable into and out of interlocking engagement with the first drum and throw-out mechanism arranged to successively disengage the head from the first drum and disengage the friction elements and to engage said elements and the head with the first drum in the reverse order.

4. In a transmission mechanism, the combination of a transmission shaft and a driven shaft arranged in axial alinement, a clutch mechanism between the shafts comprising concentric drums mounted respectively on the shafts, friction means between the drums, a pressure plate for engaging the friction means, a clutch head slidable on the driven shaft within the inner drum on the transmission shaft, said clutch head and inner drum having positively engaging clutch faces and a throw-out collar slidable on the driven shaft and connected to the clutch head, the pressure plate being located in the path of the throw-out movement of the head, a casing enclosing the clutch mechanism, a rock shaft journalled in the casing in the rear of the clutch and having an arm coacting with said collar and means on the outside of the casing for rocking the shaft.

In testimony whereof, I have hereunto signed my name, at Syracuse, in the county of Onondaga, and in the State of New York, this 7th day of August, 1924.

GEORGE C. CARHART.